US011756097B2

(12) United States Patent
Achan et al.

(10) Patent No.: US 11,756,097 B2
(45) Date of Patent: Sep. 12, 2023

(54) METHODS AND APPARATUS FOR AUTOMATICALLY DETECTING DATA ATTACKS USING MACHINE LEARNING PROCESSES

(71) Applicant: Walmart Apollo, LLC, Bentonville, AR (US)

(72) Inventors: Kannan Achan, Saratoga, CA (US); Durga Deepthi Singh Sharma, Bangalore (IN); Behzad Shahrasbi, Santa Clara, CA (US); Saurabh Agrawal, Bangalore (IN); Venugopal Mani, Sunnyvale, CA (US); Soumya Wadhwa, Sunnyvale, CA (US); Kamiya Motwani, Madhya Pradesh (IN); Evren Korpeoglu, San Jose, CA (US); Sushant Kumar, Sunnyvale, CA (US)

(73) Assignee: Walmart Apollo, LLC, Bentonville, AR (US)

(*) Notice: Subject to any disclaimer, the term of this patent is extended or adjusted under 35 U.S.C. 154(b) by 208 days.

(21) Appl. No.: 17/141,794

(22) Filed: Jan. 5, 2021

(65) Prior Publication Data
US 2022/0215453 A1    Jul. 7, 2022

(51) Int. Cl.
*G06Q 30/00* (2023.01)
*G06Q 30/0601* (2023.01)
(Continued)

(52) U.S. Cl.
CPC ....... *G06Q 30/0631* (2013.01); *G06F 18/214* (2023.01); *G06F 21/6218* (2013.01); *G06N 3/044* (2023.01)

(58) Field of Classification Search
None
See application file for complete search history.

(56) References Cited

U.S. PATENT DOCUMENTS 6,714,925 B1 * 3/2004 Barnhill ................ G06N 20/00
706/48
8,239,952 B1    8/2012 Oliphant et al.
(Continued)

FOREIGN PATENT DOCUMENTS

| CN | 102184364 A | * | 9/2011 | |
| CN | 110334670 A | * | 10/2019 | ......... G06K 9/00255 |
| WO | WO-2017111942 A1 | * | 6/2017 | ....... G06F 17/30035 |

OTHER PUBLICATIONS

Anahita Davoudi; "Detection of Profile Injection Attacks in Social Recommender Systems Using Outlier Analysis"; 2017; 2017 IEEE International Conference on Big Data (BIGDATA) (Year: 2017).*
(Continued)

*Primary Examiner* — Michelle T Kringen
*Assistant Examiner* — Norman Donald Sutch, Jr.
(74) *Attorney, Agent, or Firm* — Morgan, Lewis & Bockius LLP; Manita Rawat

(57) ABSTRACT

This application relates to apparatus and methods for automatically detecting attacks to advertisement systems. In some examples, a computing device trains a machine learning process based on a training dataset. The training dataset may be an identified portion of a website session dataset that includes a lower percentage of malicious data caused by attacks than other portions, or may include no malicious data. Once trained, the computing device generates features from a website session dataset for a customer, and applies the trained machine learning process to the generated features to detect malicious data within the website session dataset for the customer. Further, the computing device may filter the website session data to remove the detected malicious data, and may store the filtered website session data within a data repository. The computing device may provide
(Continued)

the filtered website session data to a recommendation system to generate item recommendations for the customer.

20 Claims, 8 Drawing Sheets

(51) Int. Cl.
  *G06F 21/62* (2013.01)
  *G06F 18/214* (2023.01)
  *G06N 3/044* (2023.01)

(56) References Cited

U.S. PATENT DOCUMENTS

| | | | |
|---|---|---|---|
| 8,407,797 B1 | 3/2013 | Novitchi | |
| 9,781,146 B2 | 10/2017 | Sridhar | |
| 11,562,328 B1* | 1/2023 | Jiang | G06F 16/9535 |
| 2013/0046772 A1* | 2/2013 | Gu | G06F 16/435 |
| | | | 707/E17.014 |
| 2017/0228659 A1* | 8/2017 | Lin | G06N 5/04 |
| 2019/0130285 A1* | 5/2019 | Snyder | G06N 3/04 |
| 2020/0019821 A1* | 1/2020 | Baracaldo-Angel | |
| | | | G06K 9/6298 |
| 2020/0067935 A1* | 2/2020 | Carnes, III | H04L 63/101 |
| 2020/0396233 A1* | 12/2020 | Luo | G06N 3/08 |
| 2021/0081467 A1* | 3/2021 | Chawla | G06F 40/30 |
| 2021/0201351 A1* | 7/2021 | Nag | G06F 16/24534 |

OTHER PUBLICATIONS

Biggio et al., "Wild Patterns: Ten Years After the Rise of Adversarial Machine Learning", 2018, p. 1-17.

Fang et al., "Poisoning Attacks to Graph-Based Recommender Systems", 2018, p. 1-12.

Wen et al., "With Great Dispersion Comes Greater Resilience: Efficient Poisoning Attacks and Defenses for Online Regression Models", 2020, p. 1-16.

* cited by examiner

METHODS AND APPARATUS FOR AUTOMATICALLY DETECTING DATA ATTACKS USING MACHINE LEARNING PROCESSES

TECHNICAL FIELD

The disclosure relates generally to web-based advertising systems and, more specifically, to detecting web-based advertising system attacks using machine learning processes.

BACKGROUND

At least some websites, such as retailer websites, advertise items that customers can purchase. To determine the items to advertise, some advertising systems include recommendation systems that determine the items to advertise on the websites. The recommendation system may include models that operate on customer information to determine the advertisements. In some examples, the recommendation system provides personalized item advertisement recommendations. For example, a recommendation system may operate on customer information for a first customer to determine a first set of items to advertise on a website to the first customer. Similarly, the recommendation system may operate on customer information for a second customer to determine a second set of items to advertise on the website to the second customer. Personalized item advertisement recommendations may be more relevant to customers and, as a result, the customers may be more willing to engage them.

Recommendations systems, however, may be vulnerable to attack, such as cyber-attacks or data pollution attacks. In some examples, an attack includes injecting malicious data points in an effort to sway the outcome of recommender systems, such as to promote or demote a particular item. For example, sellers or manufacturers of items provided for sale on a website may have incentive, such as financial incentive, to promote their items. The seller or manufacture of an item may initiate an attack on a website in an effort to promote their item on the website. For example, if a manufacturer of an item can sway a recommendation system to increase how often the item is recommended for advertisement, the manufacturer may gain additional sales. These attacks, however, have negative consequences on the advertisement, and sale, of other items. For example, if not for an attack, another item may have been recommended for advertisement on the website, which may have led to the sale of that other item. As such, there are opportunities to address attacks to advertisement systems.

SUMMARY

The embodiments described herein are directed to automatically detecting attacks to advertisement systems, such as cyber-attacks, data pollution attacks, push attacks, nuke attacks, white-box attacks, gray-box attacks, or any other attacks. Such attacks may cause the generation of malicious (e.g., artificial) data within website session data that recommendation systems may operate on to generate item advertisement recommendations. The embodiments employ trained machine learning processes that operate on features generated from website session data to detect the malicious data. Further, in some examples, the embodiments filter website session data to remove malicious data, and store the filtered website session data within a data repository. In some examples, the embodiments provide the filtered website session data to a recommendation system to generate item recommendations, such as item recommendations for a customer browsing a retailer's website.

As a result, the embodiments may prevent malicious actors from skewing or swaying the output of recommendations systems, such as in an effort to promote an item. Moreover, the embodiments allow advertisement systems to provide item advertisements based on "real" data (e.g., data based on real customer website interactions), thereby reducing or minimizing any impact from such attacks. In addition, by reducing the impact of malicious data, customers may be presented with more relevant personalized item advertisements, which may lead to increased sales. In addition, because a customer may spend less time searching for an item when presented with more relevant item advertisements, the embodiments may save the customer time from having to search for items. In addition, the time savings may allow time for a customer to consider additional items for purchase. In addition to or instead of these example advantages, persons of ordinary skill in the art would recognize and appreciate other advantages as well.

In accordance with various embodiments, exemplary systems may be implemented in any suitable hardware or hardware and software, such as in any suitable computing device. For example, in some embodiments, a computing device trains a machine learning process based on a training dataset. The training dataset may be an identified portion of a website session dataset that includes a lower percentage of malicious data caused by attacks than other portions, or may include no malicious data. Once trained, the computing device generates features from a website session dataset for a customer, and applies the trained machine learning process to the generated features to detect malicious data within the website session dataset for the customer. Further, the computing device may filter the website session data to remove the detected malicious data, and may store the filtered website session data within a data repository. The computing device may provide the filtered website session data to a recommendation system to generate item recommendations for the customer In some embodiments, a computing device is configured to receive user session data for a user from a server, and apply a trained machine learning model to the user session data to generate a first value. The computing device may also be configured to determine, based on the first value, whether the user session data includes polluted data. Further, the computing device may be configured to generate item recommendation data identifying at least one item to advertise based on the determination of whether the user session data includes polluted data. The computing device may be configured to transmit the item recommendation data to the server. The server may, for example, display one or more advertisements for the items identified within the item recommendation data to the user on a website.

In some embodiments, a method is provided that includes receiving user session data for a user from a server, and applying a trained machine learning model to the user session data to generate a first value. The method may also include determining, based on the first value, whether the user session data includes polluted data. Further, the method may include generating item recommendation data identifying at least one item to advertise based on the determination of whether the user session data includes polluted data. The method may also include transmitting the item recommendation data to the server.

In yet other embodiments, a non-transitory computer readable medium has instructions stored thereon, where the instructions, when executed by at least one processor, cause a computing device to perform operations that include receiving user session data for a user from a server, and applying a trained machine learning model to the user session data to generate a first value. The operations may also include determining, based on the first value, whether the user session data includes polluted data. Further, the operations may include generating item recommendation data identifying at least one item to advertise based on the determination of whether the user session data includes polluted data. The operations may also include transmitting the item recommendation data to the server.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
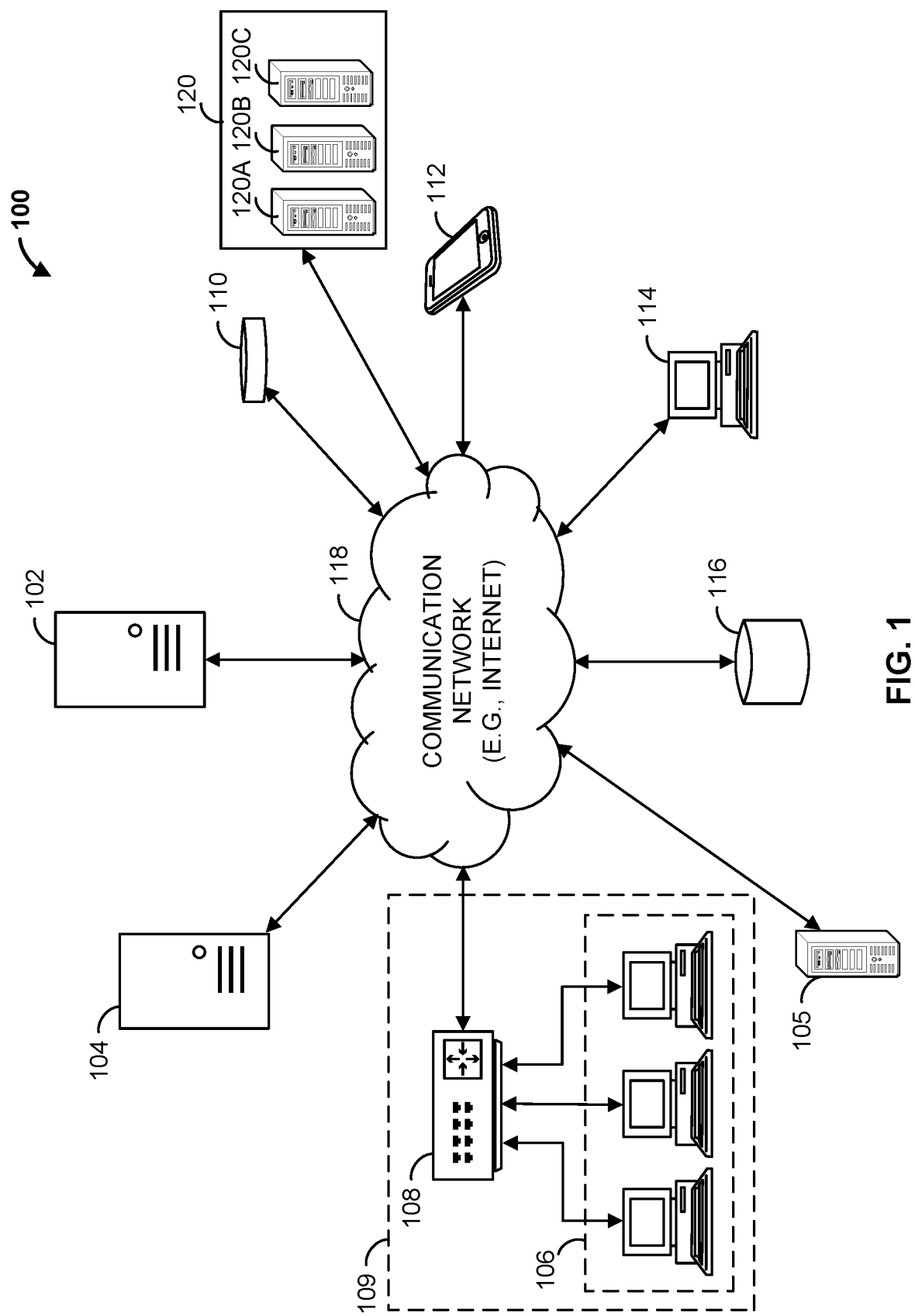
FIG. 1 is a block diagram of an advertisement system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of an advertisement system 100 that includes an attack detection computing device 102 (e.g., a server, such as an application server), a web server 104, workstation(s) 106, database 116, an item recommendation system 105, attack system 120, and multiple customer computing devices 110, 112, 114 operatively coupled over network 118. Further, attack system 120 may include one or more attack computing devices 120A, 120B, 120C.

Attack detection computing device 102, workstation(s) 106, server 104, item recommendation system 105, attack computing devices 120A, 120B, 120C, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, attack detection computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, attack detection computing device 102, item recommendation system 105, and web server 104 are operated by a retailer, and multiple customer computing devices 112, 114 are operated by customers of the retailer. Attack system 120 may be operated by actors attempting to sway item advertisement recommendations, such as those generated by item recommendation system 105 as described herein.

Although FIG. 1 illustrates three customer computing devices 110, 112, 114, advertisement system 100 can include any number of customer computing devices 110, 112, 114. Similarly, advertisement system 100 can include any number of workstation(s) 106, attack detection computing devices 102, web servers 104, item recommendation systems 105, attack systems 120, and databases 116.

Workstation(s) 106 is operably coupled to communication network 118 via router (or switch) 108. Workstation(s) 106 and/or router 108 may be located at a store 109, for example. Workstation(s) 106 can communicate with attack detection computing device 102 over communication network 118. The workstation(s) 106 may send data to, and receive data from, attack detection computing device 102. For example, the workstation(s) 106 may transmit purchase data related to orders purchased by customers at store 109 to attack detection computing device 102. In some examples, attack detection computing device 102 may transmit, in response to received purchase data, an indication of one or more item advertisements to provide to a customer. For example, the item advertisements may be displayed on a receipt handed to the customer for the purchase order.

In some examples, web server 104 hosts one or more websites, such as a retailer's website. Customers, via one or more customer computing devices 110, 112, 114, may access the website, which may allow customers to purchase items. For example, the website may advertise items for sale. The website may allow customers to add items to an online shopping cart, and purchase the items within the online shopping cart. Further, the website may include advertisements for the items. In some examples, web server 104 advertises items regardless of the customer viewing the website. In some examples, web server 104 provides for display personalized item advertisements to a customer visiting the website. For example, web server 104 may identify a customer visiting the website, and request from attack detection computing device 102 item recommendations to advertise to the customer. Attack detection computing device 102 may provide customer session data for the customer to item recommendation system 105 to obtain recommended items to advertise to the customer. Once received, attack detection computing device 102 may transmit one or more of the recommended items to web server 104. In response, web server 104 may present advertisements for the one or more recommended items to the customer on the website.

Further, web server 104 may transmit to attack detection computing device 102 customer session data related to web-based activities of customers visiting the websites. Customer session data may identify, for example, item engagements (e.g., item and advertisement clicks, item and advertisement impressions, add-to-cart (ATC) events, etc.), and search queries, for a customer (e.g., caused by the customer's engagement with the website). Web server 104 may also transmit to attack detection computing device 102 purchase data related to orders purchased on the website by customers. Attack detection computing device 102 may aggregate the customer session data and purchase data for the customer within a portion of a data repository, such as within database 116.

Attack detection computing device 102 is operable to communicate with database 116 over communication network 118. For example, attack detection computing device 102 can store data to, and read data from, database 116. Database 116 can be a remote storage device, such as a cloud-based server, a disk (e.g., a hard disk), a memory device on another application server, a networked computer, or any other suitable remote storage. Although shown remote to attack detection computing device 102, in some examples, database 116 can be a local storage device, such as a hard drive, a non-volatile memory, or a USB stick. Attack detection computing device 102 may store purchase data received from store 109 and/or web server 104 in database 116. Attack detection computing device 102 may also store user session data identifying events associated with browsing sessions, such as when a customer browses a website hosted by web server 104. In some examples, database 116 stores one or more machine learning models that, when executed by attack detection computing device 102, allow attack detection computing device 102 to determine one or more search results in response to a search query. The machine learning models (e.g., algorithms) may include, for example, Generative Adversarial Networks (GANs), decision tree models, neural networks (e.g., ANNs, CNNs), support vector machines, or any other suitable machine learning models.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Attack detection computing device 102 is operable to identify malicious data within customer session data, such as customer session data generated in response to activities of attack system 120. For example, attack system 120 may attempt to sway the items recommended by item recommendation system 105 by accessing (e.g., artificially accessing) a website hosted by web server 104, and engaging in activities that will cause web server 104 to capture customer session data not related to a "real" customer. For example, attack system 120 may access the website to continuously cause the clicking of item advertisements for a particular item, the adding of the item to an online shopping cart, viewing of the item, or any other activity to promote the item. As a result of this malicious activity, item recommendation system 105 may promote the item (e.g., recommend the item more often), based on the apparent increased customer activity with the item.

To reduce or eliminate the effect of such malicious activity, attack detection computing device 102 may employ one or more trained machine learning models, such as a semi-supervised attack detection algorithm, to identify the malicious data within customer session data. In some examples, the machine learning model is based on a generative model, such as a sequential Generative Adversarial Networks (GAN) architecture. To identify polluted customer session data, attack detection computing device 102 may first identify a portion of a customer session dataset determined to have no chance, or a lower chance, of being polluted by malicious activity (e.g., a "clean" dataset). For example, the clean dataset can include sessions that are generated by only logged-in and highly engaged users, which have a higher confidence of being genuine users. Sessions for other users may be considered "polluted," at least initially. Attack detection computing device 102 may train a machine learning model based on the determined portion of the customer session dataset, which includes sequential data (e.g., the customer's interaction activities with a website during a particular browsing session), to learn a distribution of genuine customer session data. The user session data may include item-level features such as historical view rates, historical ATC rates, and item order rates, user-level features such as length of view sequences, click-through rates (CTR), ATC, and Buy Through Rates (BTR), and session-level features such as view sequences, ATC sequences, pairwise features (e.g., co-views, items bought together), and product embeddings. For example, attack detection computing device 102 may train a GAN model that includes a generator and a discriminator. The generator generates data that serves as negative examples to the discriminator during training.

As an example, let $u_i \in U$ represent the $i^{th}$ user (e.g., customer) visiting a retailer's website, such as one hosted by web server 104. Additionally, assume $u_i$ is associated with an arbitrary number of user sessions $s_{ij} \in S_i$, where j>0 is the $j^{th}$ session of the user $u_i$, and $S_i \in S$, where $S_i$ is the set of all sessions of user $u_i$ and S is the set of all user sessions $S_i$.

In addition, let a user session s be a sequence of user signals over a span of time t (e.g., a sequence of page browse activities (such as impressions, clicks) within one session or basket of items that the user purchased). As such, let user session s be defined as s=

$$[v_1, \ldots, v_l \ldots v_{k_{ij}}],$$

where $v_l$ represents the $l^{th}$ item that the user interacted with in user session s. Without loss of generality assume a length $k_{ij} <= K$ for any user session sequence $s_{ij}$. Moreover, each item may be associated with attributes (e.g., contextual features), such as a title, an item description, a brand, or a price. Each item may be mapped into an embedding space using a language model that operates on each item's corresponding attributes. As such, a user session, such as user session s, may be represented by a sequence of embeddings. The item embedding $e_i$ for an item $v_i$ may be represent by the equation below:

$$e_i = \varepsilon(\mathcal{D}(v_i)) \quad \text{(eq. 1)}$$

In the above equation, $\mathcal{D}()$ represents a function that returns attributes for the item $v_i$ and $\varepsilon()$ represents an embedding function that generates a d dimensional item embedding (e.g., 5 dimensional, 10 dimensional) from semantic item features using a pre-trained language model such as Doc2Vec, Word2Vec, or Bidirectional Encoder Representations from Transformers (BERT) to translate words to numerical values. Accordingly, user session sequence $s_{ij}$ may be represented using the equation below.

$$s_{ij} = [e_1, e_2, \ldots, e_{k_{ij}}] \quad \text{(eq. 2)}$$

Referring back to the GAN model, the "clean" part of a dataset is used to generate the embedding sequences $s_{ij}$ from user sessions in accordance with Equation 1 above and using a language model, such as the Doc2Vec language model.

Moreover, the generator of the GAN model may be of an Long Short Term Memory (LSTM) architecture that maps item embeddings in a user session $e_1, e_2, \ldots, e_K$ to a sequence of hidden states, represented here by $o_1, o_2, \ldots, o_K$. Moreover, the update function $G_{LSTM}()$ for the generator may be represented using the equation below.

$$o_l = G_{LSTM}(o_{l-1}, e_l) \quad \text{(eq. 3)}$$

where: $\forall l \in 1, \ldots, K$.

Accordingly, the probability distribution of the $l^{th}$ item in a user session, $y_l$ may be determined in accordance with the following equation:

$$p(y_l | e_1, e_2, e_k) = z(o_l) = z(G_{LSTM}(o_{l-1}, e_l)) \quad \text{(eq. 5)}$$

where: $z()$ is the softmax function.

Attack detection computing device 102 may train the sequential GAN model based on the "clean" part of the dataset. In some examples, during training the gradients are not allowed to update the item embeddings (e.g., $e_x$). Thus, the contextual item embeddings remain unchanged during pre-training and training steps of the GAN model. As a result, during training of the GAN model, the generator converges to the distribution of real sequences, while the discriminator learns a decision boundary (e.g., tight decision boundary) around the distribution of real looking sequences.

Once training is complete (e.g., based on the satisfaction of one or more metrics, such as meeting Receive Operating Characteristic Curve (ROC), True Positive Rate (TPR), False Positive Rate (FPR), or Area Under the Curve (AUC) thresholds, etc.), attack detection computing device 102 may evaluate the "polluted" part of the dataset using the sequential GAN model. For example, attack detection computing device 102 may apply the trained machine learning model to customer session data for customers visiting a website, such as a website hosted by web server 104, to identify whether the customer session data includes malicious data. As a result of the training, the discriminator may detect with high success rates polluted data, even polluted data caused by more sophisticated data pollution attacks, such as attacks by attack system 120.

In some examples, attack detection computing device 102 detects the presence of data pollution and removes the polluted data from a dataset that is used to train the recommender systems (e.g., item recommendation system 105). For example, attack detection computing device 102 removes from training data provided to item recommendation system 105 any data determined to be "polluted". As such, any models executed by item recommendation system 105 would train on "clean" data, or at least less polluted data, thereby enabling the models to predict with better accuracy item recommendations for customers. By removing the polluted data from the training dataset, the output of the recommender system may change for all the users, and not just for the polluting user.

Figure 2:
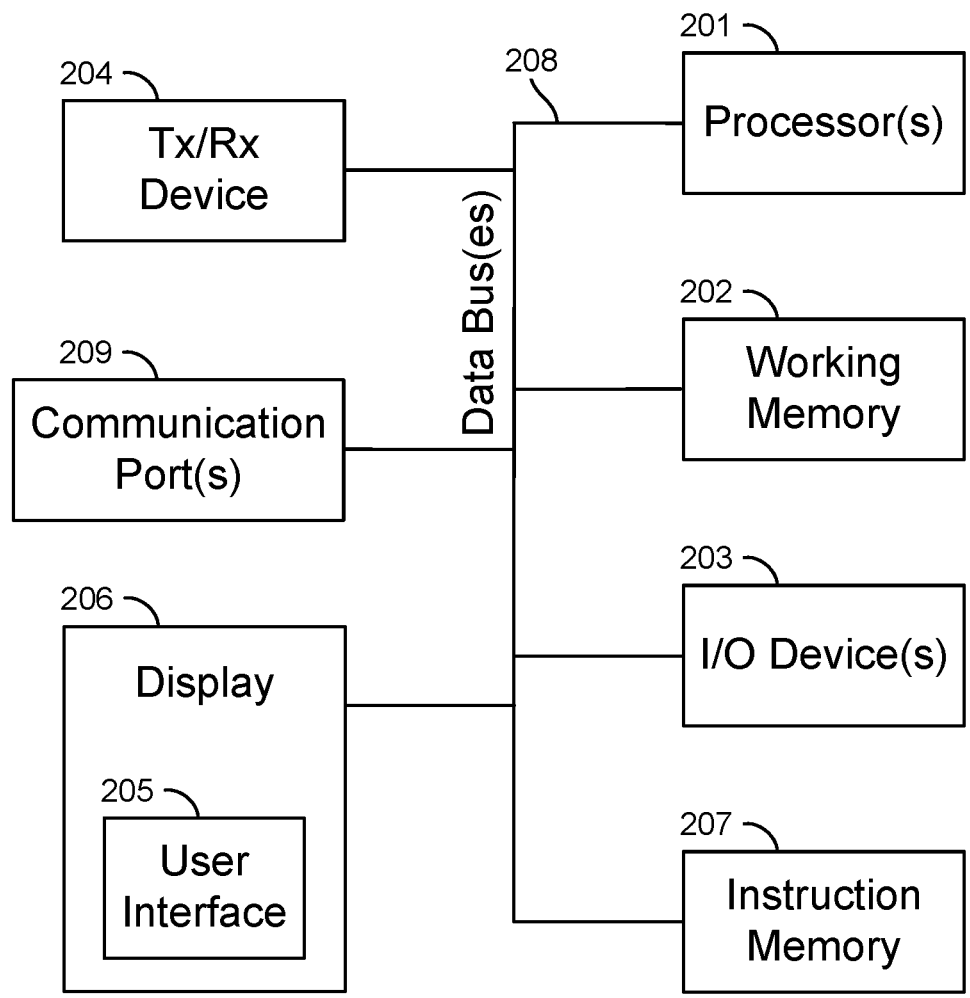
FIG. 2 is a block diagram of the attack detection computing device of the advertisement system of FIG. 1 in accordance with some embodiments.

FIG. 2 illustrates the attack detection computing device 102 of FIG. 1. Attack detection computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more processing cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of attack detection computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with attack detection computing device 102. For example, user interface 205 can be a user interface for an application of a retailer that allows the retailer to select machine learning models to be applied to user session data received from web server 104, such as user session data received for customers accessing a retailers website hosted by web server 104. In some examples, a user can interact with user interface 205 by engaging input-output devices 203. In some examples, display 206 can be a touchscreen, where user interface 205 is displayed by the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 attack detection computing device 102 will be operating in. Processor(s) 201 is operable to receive data from, or send data to, a network, such as communication network 118 of FIG. 1, via transceiver 204.

Figure 3:
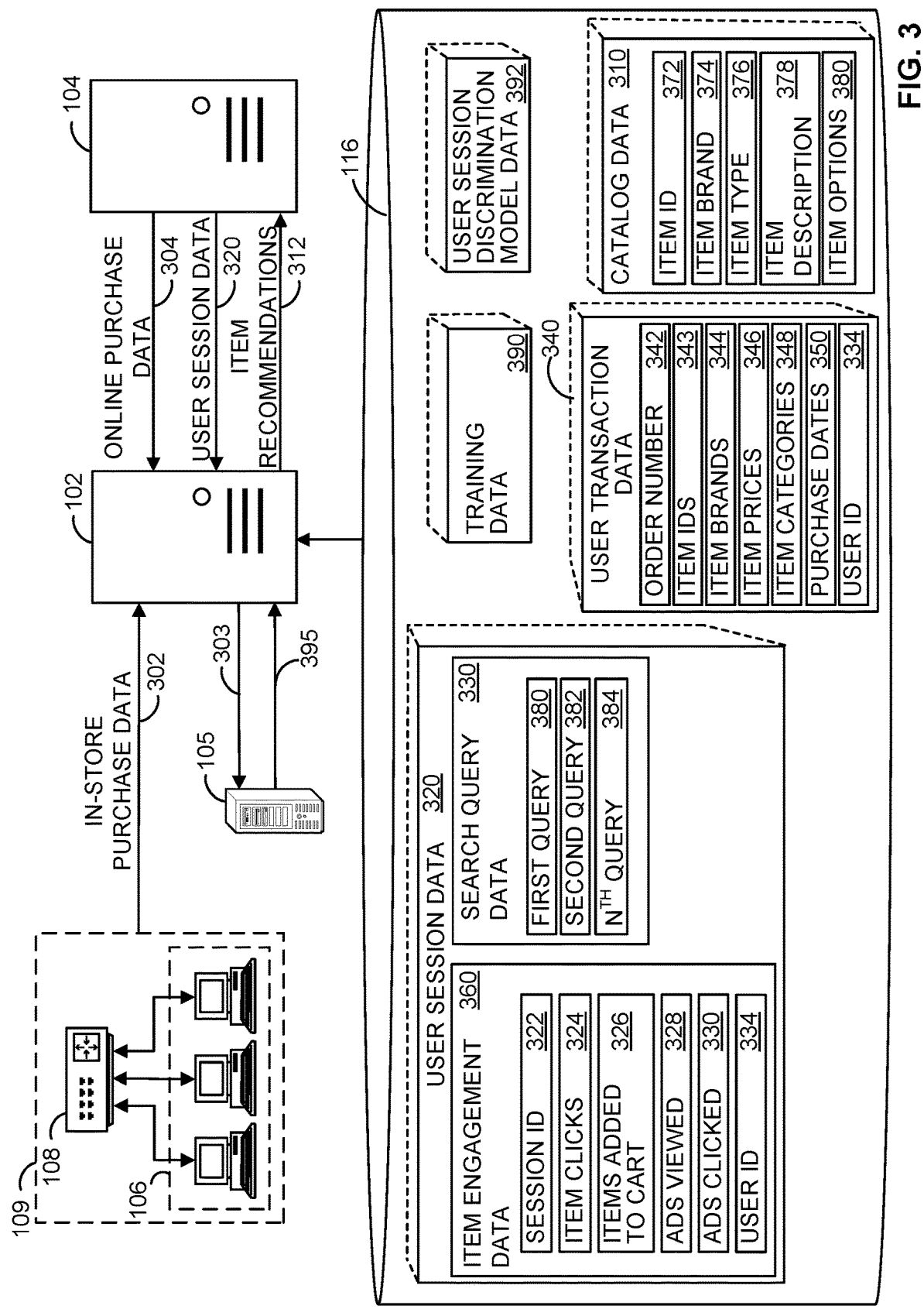
FIG. 3 is a block diagram illustrating examples of various portions of the advertisement system of FIG. 1 in accordance with some embodiments.

FIG. 3 is a block diagram illustrating examples of various portions of the advertisement system 100 of FIG. 1. As indicated in the figure, attack detection computing device 102 may receive user session data 320 from web server 104, and may store the user session data 320 within database 116. User session data 320 identifies, for each user, data related to a browsing session, such as when browsing a retailer's webpage hosted by web server 104. For example, user session data 320 may identify item-level features such as historical view rates, historical ATC rates, and item order rates, user-level features such as length of view sequences, CTRs, ATCs, and BTRs, and session-level features such as view sequences, ATC sequences, and pairwise features (e.g., co-views, items bought together).

In this example, user session data 320 includes item engagement data 360 and search query data 330. Item engagement data 360 may include one or more of a session ID 322 (i.e., a website browsing session identifier), item clicks 324 identifying items which the user clicked (e.g., images of items for purchase, keywords to filter reviews for an item), items added-to-cart 326 identifying items added to the user's online shopping cart, advertisements viewed 328 identifying advertisements the user viewed during the browsing session, advertisements clicked 330 identifying advertisements the user clicked on, and user ID 334 ID (e.g., a customer ID, retailer website login ID, etc.). Search query data 330 identifies one or more searches conducted by a user during a browsing session (e.g., a current browsing session). In this example, search query data 330 includes first query 380, second query 382, and $N^{th}$ query 384.

Attack detection computing device 102 may also receive in-store purchase data 302 identifying and characterizing one or more purchases from one or more stores 109. Similarly, attack detection computing device 102 may receive online purchase data 304 from web server 104, which identifies and characterizes one or more online purchases, such as from a retailer's website. Attack detection computing device 102 may parse in-store purchase data 302 and online purchase data 304 to generate user transaction data 340. In this example, user transaction data 340 may include, for each purchase, one or more of an order number 342 identifying a purchase order, item IDs 343 identifying one or more items purchased in the purchase order, item brands 344 identifying a brand for each item purchased, item prices 346 identifying the price of each item purchased, item category 348 identifying a category of each item purchased, a purchase date 350 identifying the purchase date of the purchase order, and user ID 334 for the user making the corresponding purchase.

Database 116 may further store catalog data 310, which may identify one or more attributes of a plurality of items (e.g., product embeddings), such as a portion of or all items a retailer carries. Catalog data 310 may identify, for each of the plurality of items, an item ID 372 (e.g., an SKU number), item brand 374, item type 376 (e.g., grocery item such as milk, clothing item), item description 378 (e.g., a description of the product including product features, such as ingredients, benefits, use or consumption instructions, or any other suitable description), and item options 380 (e.g., item colors, sizes, flavors, etc.).

Database 116 further includes training data 390, which may identify a portion of user session data 320 meeting predetermined conditions and thus considered "clean." For example, training data 390 may identify a portion of user session data 320 that includes user sessions for users that were logged-in during the session and were "highly" engaged. For example, highly engaged users may be users that have a minimum level of interaction with the corresponding website during the session (e.g., a minimum number of clicks, impressions, purchases, etc.). The minimum level of interaction may be predefined, and stored as "rules" within database 116. Attack detection computing device 102 may generate training data 390 identifying user sessions within user session data 320 meeting the predetermined conditions, and may store training data 390 within database 116.

Further, database 116 stores user session discrimination model data 392, which identifies and characterizes one or more machine learning models, such as the GAN model described herein. Attack detection computing device 102 may train each of the machine learning models, and may apply each trained machine learning model to user session data 320 and/or user transaction data 340 to identify malicious data as described herein.

For example, attack detection computing device 102 may receive user session data 320 for a user currently browsing a website hosted by web server 104. The user session data 320 may identify a user (e.g., via a user ID 334), of the user browsing the website. Attack detection computing device 102 may apply a trained machine learning model to the user session data 320 to determine whether the user session data 320 includes "polluted" data (e.g., malicious data causes by, for example, attack system 120). For example, attack detection computing device 102 may obtain a trained GAN model, such as the sequential GAN model described herein, from user session discrimination model data 392 stored in database 116. Attack detection computing device 102 may apply the trained machine learning model to the user session data 320, and determine whether the user session data 320 includes polluted data based on the output data generated by the trained machine learning model. For example, if the output data includes one or more values below a predetermined threshold, attack detection computing device 102 may consider the user session data 320 to include polluted data. If, however, the output data does not include values at or above the predetermined threshold, attack detection computing device 102 may consider the user session data 320 to not include any polluted data.

If the user session data 320 does not include polluted data, attack detection computing device 102 stores the user session data 320 within a corresponding portion of database 116. Further, attack detection computing device 102 may generate an item advertisement request 303 requesting recommended items to advertise for the user, and may transmit the item advertisement request 303 to item recommendation system 105. Item advertisement request 303 may include the received user session data 320 and, in some examples, additional user session data 320 for the user stored in database 116 from previous sessions. In some examples, item advertisement request 303 also includes user transaction data 340 for the user.

In response to receiving item advertisement request 303, item recommendation system 105 may determine a set of recommended items for the user, and may transmit recommended item data 395 identifying the set of recommended items (e.g., recommended items 399) to attack detection computing device 102. Attack detection computing device 102 may then package the recommended items within item recommendations 312, and may transmit the item recommendations 312 to web server 104. Web server 104 may then display advertisements for one or more of the recommended items identified within item recommendations 312. For example, web server 104 may display advertisements for one or more of the items to the user while the user is browsing a product category web page, or an item web page, of the retailer's website.

If, however, attack detection computing device 102 determines that the user session data 320 includes "polluted" data (e.g., based on application of the trained machine learning model), attack detection computing device 102 identifies the received user session data 320 as polluted, and stores the polluted user session data 320 within a corresponding portion of database 116 (e.g., and marked polluted). Attack detection computing device 102 may not provide the polluted user session data 320 to item recommendation system 105. In some examples, attack detection computing device 102 generates a random set of items to advertise, and packages the random set within item recommendations 312 to transmit to web server 104. In some examples, attack detection computing device 102 does not transmit any set of items to advertise to web server 104 when determining that the user session data 320 is "polluted."

In some examples, when a customer sequence (e.g., user session data 320 for the customer) is deemed polluted, that session is removed from the training data used for training the recommender system (e.g., item recommendation system 105). By removing the session from the training data used to train the recommender system, the quality of recommendations provided by the recommender system for all customers is improved. In other words, item recommendations provided by the recommender system will be "cleaner" for all customers by discarding polluted sequences.

In addition, if there is no additional customer sequence data for the customer to provide to the recommender system to generate item recommendations for the customer, the recommender system may provide "Default" item recommendations. For example, the "Default" item recommendations may include a group of popular items.

Figure 4A:
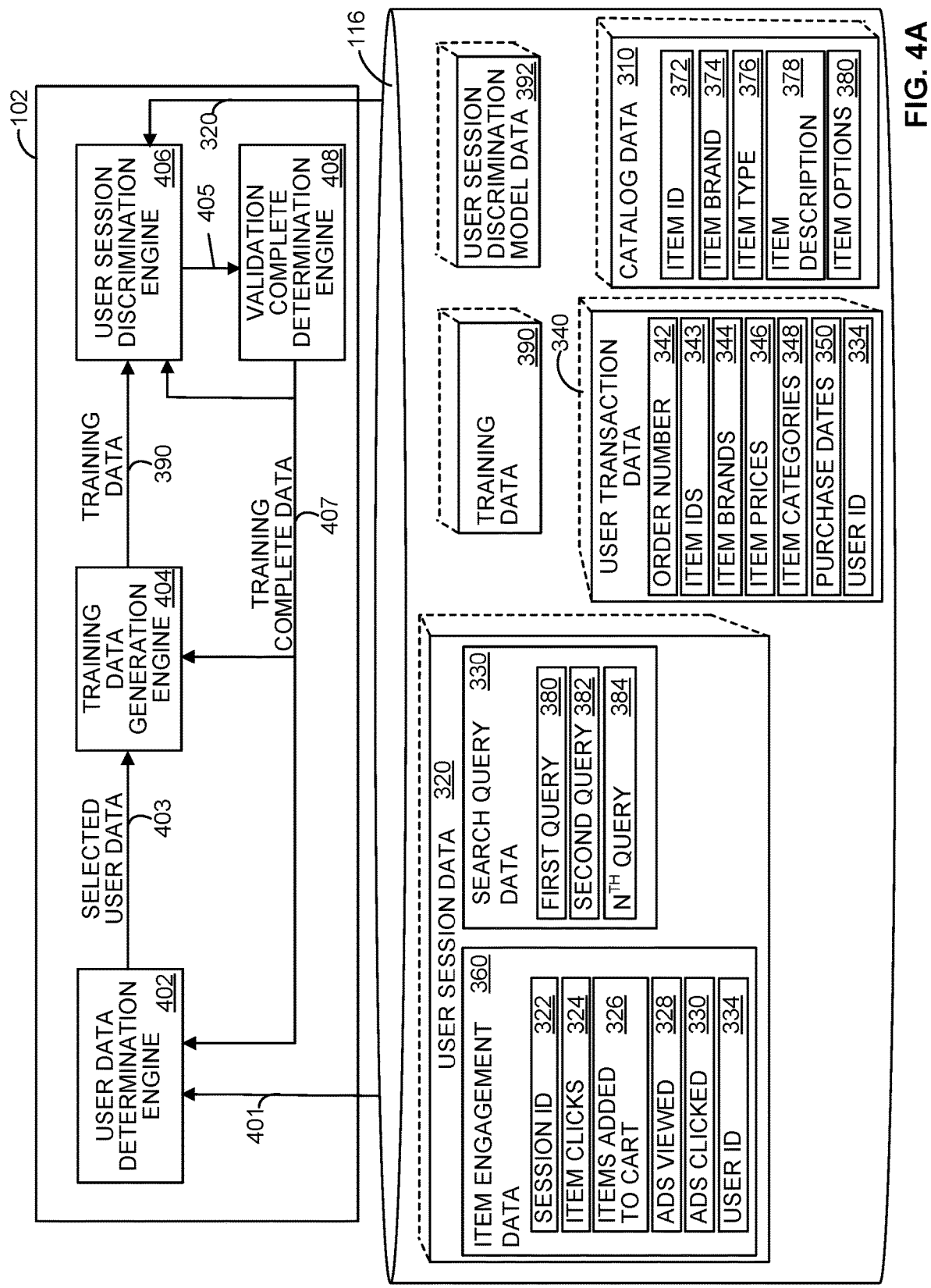
FIG. 4A is a block diagram illustrating examples of various portions of the attack detection computing device of FIG. 1 in accordance with some embodiments.

FIG. 4A illustrates further exemplary portions of the attack detection computing device 102 of FIG. 1. Specifically, FIG. 4A illustrates the training of a machine learning model (e.g., as identified by user session discrimination model data 392), such as the sequential GAN model described herein. As indicated in FIG. 4A, attack detection computing device 102 includes user data determination engine 402, training data generation engine 404, user session discrimination engine 406, and validation complete determination engine 408. In some examples, one or more of user data determination engine 402, training data generation engine 404, user session discrimination engine 406, and validation complete determination engine 408 may be implemented in hardware. In some examples, one or more of user data determination engine 402, training data generation engine 404, user session discrimination engine 406, and validation complete determination engine 408 may be implemented as an executable program maintained in a tangible, non-transitory memory, such as instruction memory 207 of FIG. 2, that may be executed by one or processors, such as processor 201 of FIG. 2.

In this example, user data determination engine 402 is configured to determine a "clean" dataset for training based on user session data 320 stored within database 116. For example, user data determination engine 402 may identify user sessions that meet predetermined conditions. For example, user data determination engine 402 may determine user sessions that include a minimum level of interaction with a corresponding website, such as a minimum number of clicks, impressions, or purchases, for example. The minimum level of interaction may be predefined, and stored as "rules" within database 116. User data determination engine 402 may generate selected user data 403 identifying the selected user sessions, and may provide selected user data 403 to training data generation engine 404.

Training data generation engine 404 may generate training data 390 to train the machine learning model. For example, training data generation engine 404 may obtain attributes for any items identified by selected user data 403 from catalog data 310 stored in database 116, and may apply a language model, such as Doc2Vec, to the obtained attributes to translate attribute words to numerical values. Training data generation engine 404 may generate feature vectors based on selected user data 403 and the determined numerical values, and package the generated feature vectors within training data 390. As such, training data 390 includes sequential data based on the selected user data. Training data generation engine 404 may provide the training data 390 to user session discrimination engine 406, which trains the machine learning model (e.g., the sequential GAN model described herein). For example, user session discrimination engine 406 applies the machine learning model to training data 390, and generates model output data 405 which may include numeral values.

User session discrimination engine 406 may train the machine learning model with training data 390 that is based on selected user data 403 corresponding to a temporal interval of time (e.g., 3 months, 6 months). Once complete, user session discrimination engine 406 may apply the initially trained machine learning model to user session data 320 obtained from database 116 (which may include "clean," or "polluted," user sessions). User session discrimination engine 406 generates model output data 405, and provides the model output data 405 to validation complete determination engine 408 for validation.

Validation complete determination engine 408 may determine whether training of the machine learning is complete based on determining the satisfaction of one or metrics. For example, validation complete determination engine 408 may determine whether one or more predefined metric thresholds (e.g., minimum values), such as thresholds for ROC, AUC, TPR, or FPR, are satisfied based on model output data 405. As an example, validation complete determination engine 408 may compare model output data 405 to expected results to determine whether the machine learning model is sufficiently trained. If the one or more metrics are not satisfied, validation complete determination engine 408 generates complete data 407 identifying that the training of the machine learning model is not complete, and user data determination engine 402, training data generation engine 404, and user session discrimination engine 406 continue to train the machine learning model as described above. Otherwise, if the metrics are satisfied, validation complete determination engine 408 generates complete data 407 identifying that the training of the machine learning model is complete, and user session discrimination engine 406 stores the trained machine learning model as user decision discrimination model data 392 within database 116.

Figure 4B:
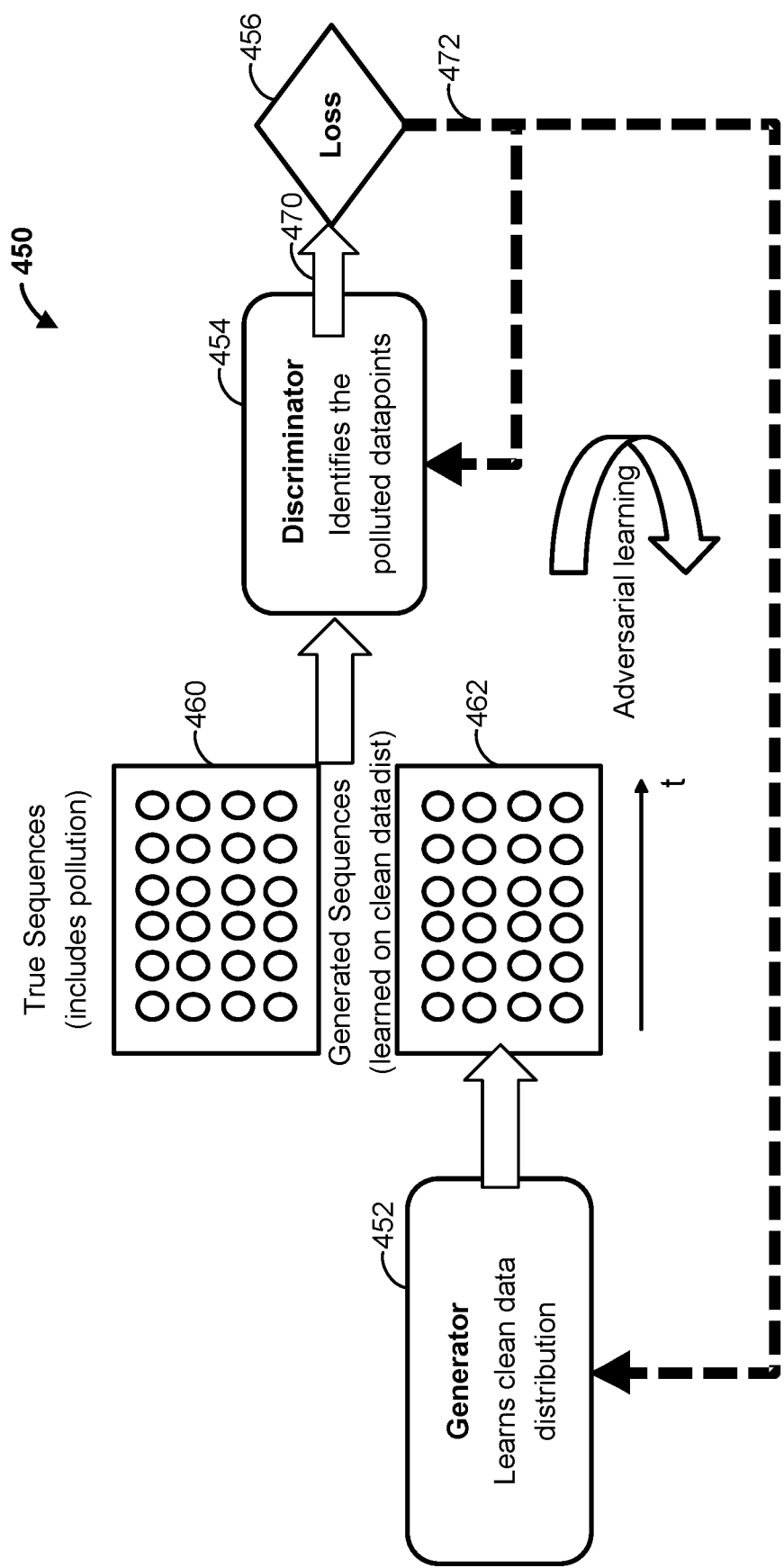
FIG. 4B is a block diagram illustrating an example of a machine learning model in accordance with some embodiments.

FIG. 4B illustrates an example block diagram of a machine learning model 450, such as one employed by user session discrimination engine 406. In this example, the machine learning model 450, which may be a sequential GAN model, includes a generator 452 and a discriminator 454. The machine learning model 450 undergoes adversarial learning over a period of time. For example, the generator 452 is trained with clean data (e.g., user sessions that meet predetermined conditions), learns a clean data distribution, and can generate sequences 462 that are provided to the discriminator 454. In addition, the discriminator 454 receives true sequences 460 (e.g., sequences that may include polluted data), to generate output data 470.

Further, a loss module 456 receives the output data 470, and computes the loss 472, which is provided back to the generator 452 and discriminator 454. The loss 472 may be a distance between the distribution of the data generated by the machine learning model 450 (e.g., as identified by output data 470) and a distribution of the real data (e.g., user session data 320 stored in database 116). Loss module 456 may compute the loss according to a Minimax Loss algorithm or Wasserstein loss algorithm, for example. In some examples, the generator 452 may attempt to minimize the loss 472 while the generator 454 attempts to maximize the loss 472.

In this example, the generator 452 converges to the distribution of true sequences 460, while the discriminator 454 learns a decision boundary (e.g., tight decision boundary) around the distribution of true sequences 460. In other words, machine learning model 450 is trained to learn the distribution of user signals using generated sequences 462 (e.g., a clean dataset) and then determines datapoints in true sequences 460 (e.g., a potentially polluted set) that are unlikely to come from the distribution of generated sequences 462.

Figure 5:
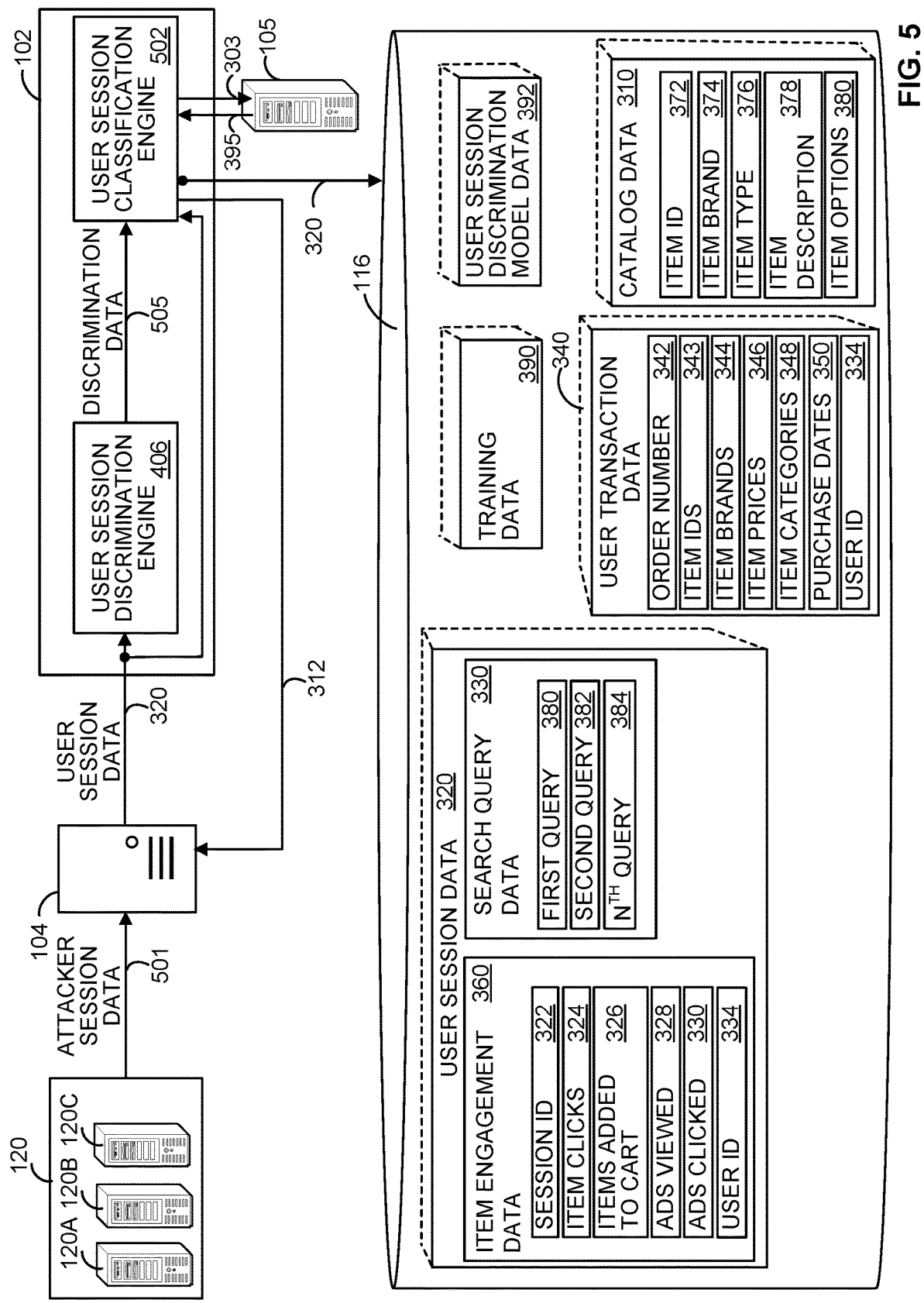
FIG. 5 is a block diagram illustrating examples of various portions of the advertisement system of FIG. 1 in accordance with some embodiments.

FIG. 5 illustrates further exemplary portions of the attack detection computing device 102 of FIG. 1. In this example, attack system 120 (via one or more attack computing devices 120A, 120B, 120C) initiates one or more website browsing sessions with a website hosted by web server 104. Attack system 120 engages with the website, by viewing or clicking on items or advertisements within one or more webpages of the website, as identified and characterized by attacker session data 501. Web server 104 receives and captures attacker session data 501, parses the user activity, and packages the user activity within user session data 320. Web server 104 transmits the user session data to attack detection computing device 102.

In this example, in addition to user session discrimination engine 406, attack detection computing device 102 further includes user session classification engine 502. User session classification engine 502 may be implemented in hardware or, in some examples, implemented as an executable program maintained in a tangible, non-transitory memory, such as instruction memory 207 of FIG. 2, that may be executed by one or processors, such as processor 201 of FIG. 2.

User session discrimination engine 406 may apply a trained machine learning model, such as a machine learning model trained as discussed with respect to FIG. 4A, to user session data 320 to determine whether user session data 320 includes "polluted" data. Based on application of the trained machine learning model to user session data 320, user session discrimination engine 406 generates discrimination data 505, which may include numerical values. User session discrimination engine 406 provides the discrimination data 505 to user session classification engine 502 for classification (e.g., inference).

User session classification engine 502 may determine, based on discrimination data 505, if user session data 320 includes polluted data. For example, user session classification engine 502 may compare discrimination data 505 to predetermined values. If discrimination data 505 identifies values beyond (e.g., at or above) a predetermined value, user session classification engine 502 may determine that user session data 320 does not include polluted data, and may store user session data 320 within a corresponding portion of database 116 (e.g., corresponding to a user identified by the received user session data). Moreover, user session classification engine 502 may generate and transmit to item recommendation system 105 item advertisement request 303, and in response receive recommended item data 395 from item recommendation system 105. User session classification engine 502 may parse recommended item data 395, and generate item recommendations 312 identifying the items to advertise. User session classification engine 502 may transmit the item recommendations 312 to web server 104. Web server 104 may then display on the website one or more advertisements for the items identified by item recommendations 312.

If, however, discrimination data 505 identifies values that are not beyond (e.g., below) the predetermined value, user session classification engine 502 may determine that user session data 320 does include polluted data, may mark 320 as polluted, and store the polluted user session data 320 within a corresponding portion of database 116. In some examples, user session classification engine 502 may not transmit any item recommendations 312 to web server 104. In some examples, user session classification engine 502 may generate a random set of items to advertise, and include the random set within item recommendations 312 for transmission to web server 104.

Figure 6:
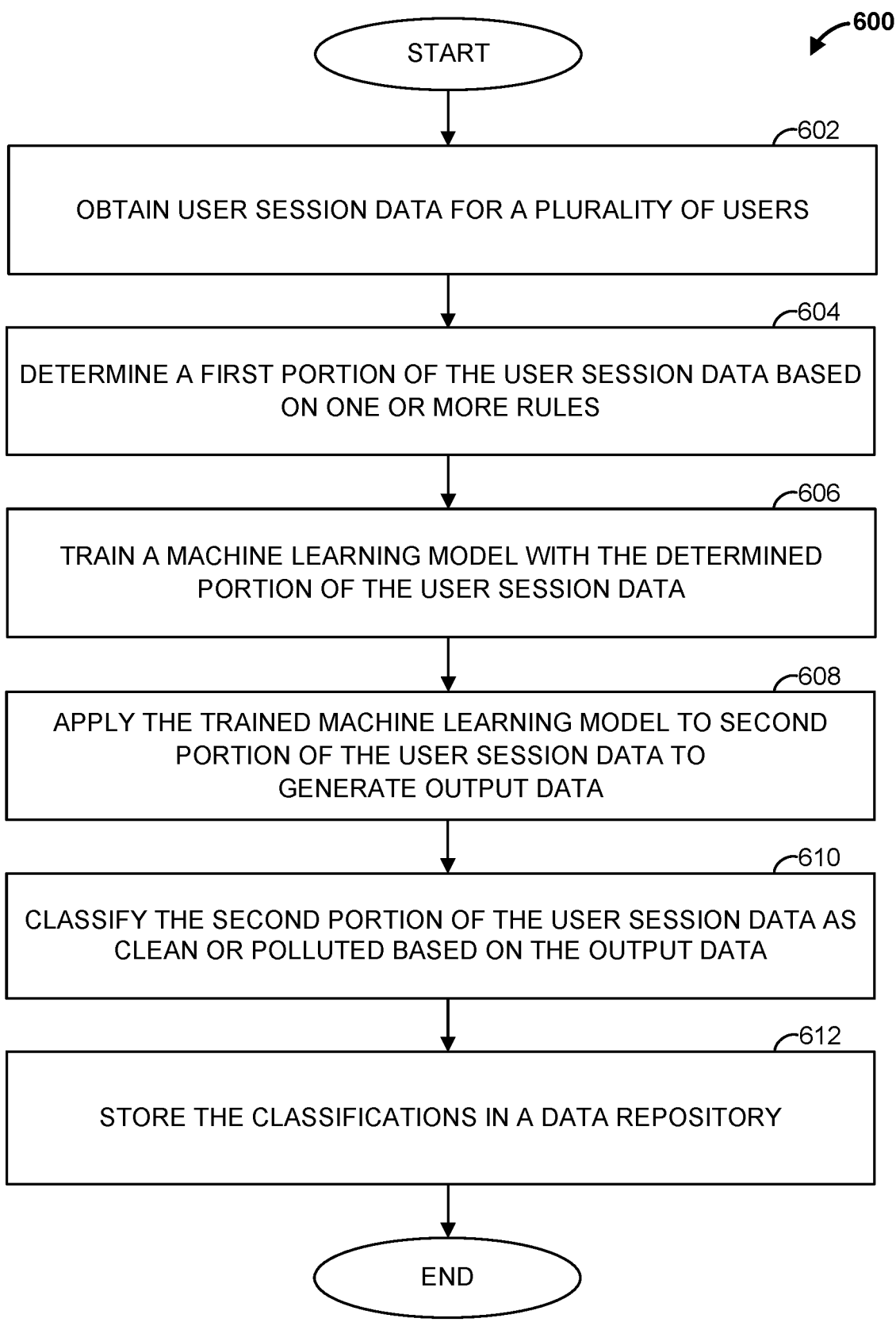
FIG. 6 is a flowchart of an example method that can be carried out by the advertisement system of FIG. 1 in accordance with some embodiments.

FIG. 6 is a flowchart of an example method 600 that can be carried out by the advertisement system 100 of FIG. 1. Beginning at step 602, a computing device, such as attack detection computing device 102, obtains user session data (e.g., user session data 320 from database 116) for a plurality of users. At step 604, the computing device determines a first portion of the user session data based on one or more rules. The first portion of the user session data may be one determined to be "clean." For example, the computing device may determine user sessions for logged in users that were highly engaged as described herein.

Proceeding to step 606, the computing device trains a machine learning model with the determined portion of the user data. As an example, the computing device may train a sequential GAN model with the determined portion of the user data as described herein. At step 608, the computing device applies the trained machine learning model to a second portion of the user session data to generate output data. For example, the second portion of the user session data may include user session data not meeting the one or more rules, and may include clean and polluted user session data.

At step 610, the computing device classifies the second portion of the user session data as clean or polluted based on the output data. For example, the computing device may determine whether portions of the second portion of the user session data are clean or polluted by comparing corresponding output data to predetermined thresholds. If the computing device determines that values of the output data are at or above a predetermined threshold, the computing device determines that the corresponding portions of the second portion of the user session data does not include polluted data. Otherwise, if the computing device determines that values of the output data are below a predetermined threshold, the computing device determines that the corresponding portions of the second portion of the user session data do include polluted data. Further, and at step 612, the computing device stores the classifications in a data repository, such as database 116. The method then ends.

Figure 7:
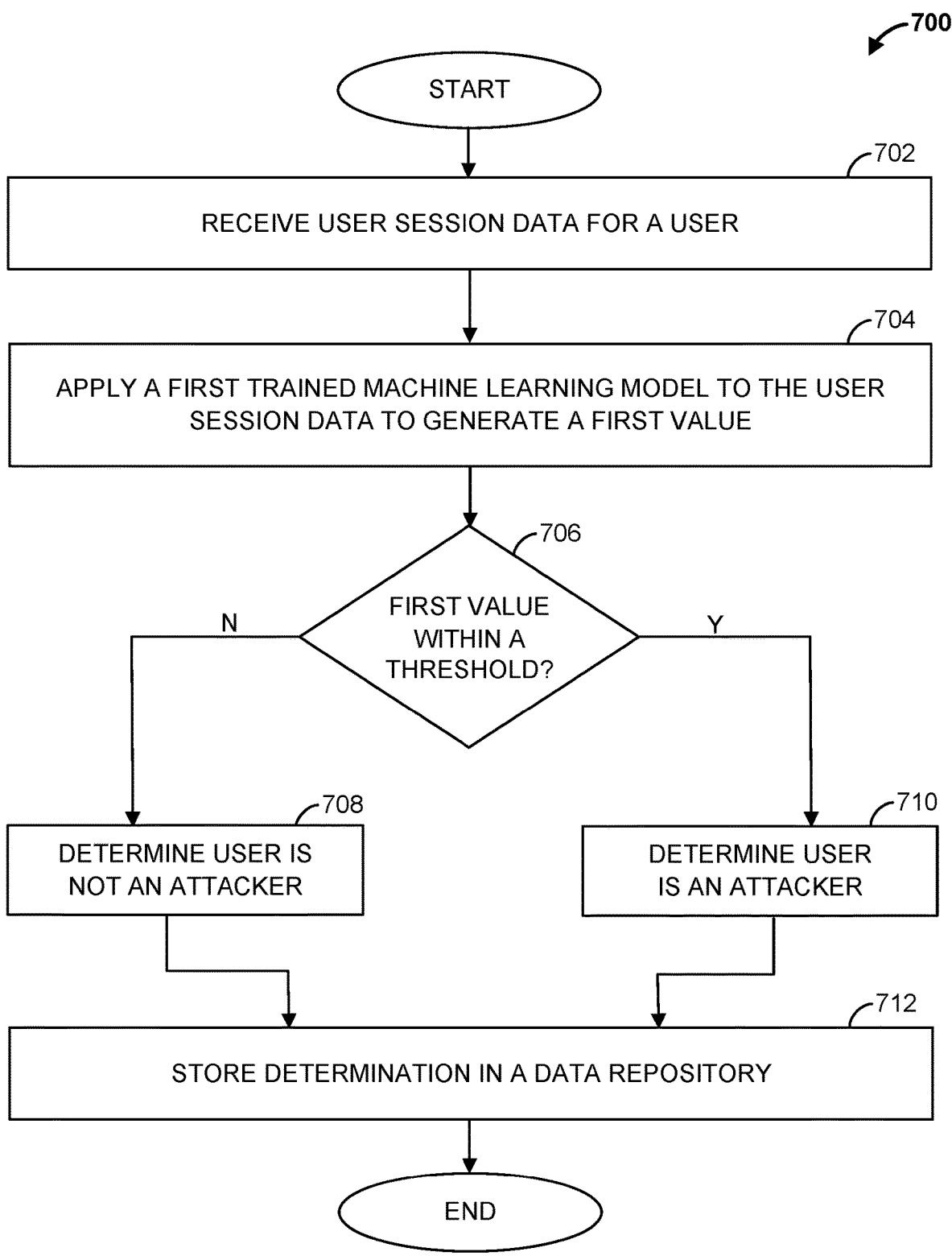
FIG. 7 is a flowchart of another example method that can be carried out by the advertisement system of FIG. 1 in accordance with some embodiments.

FIG. 7 is a flowchart of an example method 700 that can be carried out by the advertisement system 100 of FIG. 1. At step 702, a computing device, such as attack detection computing device 102, receives user session data for a user. For example, the computing device may receive user session data 320 from a web server 104 for a user browsing a website hosted by web server 104. At step 704, a trained machine learning model is applied to the user session data to generate a first value. For example, the computing device may apply a trained sequential GAN model to the received user session data to generate the first value.

Proceeding to step 706, the computing device classifies the user session data as clean or polluted based on the first value. For example, the computing device may determine whether the user session data is clean or polluted by comparing the first value to a predetermined threshold. If the computing device determines that the first value is at or above the predetermined threshold, the computing device determines that the user session data does not include polluted data, and proceeds to step 708. At step 708, the computing device determines that the user is not an attacker, and proceeds to step 712.

Otherwise, if the computing device determines that the first value is below the predetermined threshold, the computing device determines that the user session data does include polluted data, and proceeds to step 710. At step 710, the computing device determines that the user is an attacker, and proceeds to step 712.

At step 712, the computing device stores the determination in a data repository. For example, the computing device may generate user data identifying whether the user is an attacker, and may store the user data within a corresponding portion of database 116. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising: a computing device configured to:
    determine a first portion of aggregated user session data for a plurality of users based on at least one rule, wherein the first portion includes user sessions for users that have at least a minimum level of interaction with a corresponding website;
    generate a session dataset based on the determined first portion of the aggregated user session data;
    train a machine learning model based on the session dataset;
    receive user session data for a user from a server, wherein the user session data is aggregated with the session dataset;
    apply the trained machine learning model to the user session data to generate output data, the output data including a first value associated with the user session data;
    compare the first value to a predetermined threshold to generate a comparison;
    determine, based on the comparison, whether the user session data includes polluted data;
    generate item recommendation data identifying at least one item to advertise based on the determination of whether the user session data includes polluted data;
    transmit the item recommendation data to the server;
    refine, based on the determination of whether the user session data includes polluted data, the machine learning model, wherein refining the machine learning model includes removing the polluted data from the aggregated session dataset;
    generate loss data based on the output data, the loss data being a difference between the output data and session data within the session dataset; and
    refine the machine learning model based on the loss data.

2. The system of claim 1, wherein the computing device is configured to:
store the trained machine learning model within a data repository.

3. The system of claim 2, wherein the machine learning model is a sequential Generative Adversarial Networks (GAN) model comprising a generator and a discriminator.

4. The system of claim 3, wherein training the machine learning model comprises training the generator with the determined first portion of the aggregated user session data, and wherein the generator converges to a distribution of real sequences of the first portion of the aggregated user session data and the discriminator learns a decision boundary around the distribution of the real sequences.

5. The system of claim 4, wherein the computing device is further configured to determine that the first portion of the aggregated user session data is not polluted based on the at least one rule.

6. The system of claim 3, wherein the generator is based on a Long Short Term Memory (LSTM) architecture.

7. The system of claim 2, wherein the computing device is further configured to validate the machine learning model by:
applying the trained machine learning model to a second portion of the aggregated user session data to generate a second value; and
determining whether a metric is satisfied based on the second value.

8. The system of claim 7, wherein determining whether the metric is satisfied comprises continuing to train the machine learning model when the metric is not satisfied.

9. The system of claim 1, wherein generating the item recommendation data identifying the at least one item to advertise comprises:
requesting the at least one item to advertise from an item recommendation system when the user session data does not include polluted data; and
determining the at least one item to advertise randomly when the user session data includes polluted data.

10. The system of claim 1, wherein the computing device is configured to generate embedding vectors based on the user session data according to $e_i=\varepsilon(D(v_i))$, and wherein applying the trained machine learning model to the user session data comprises applying the trained machine learning model to the generated embedding vectors.

11. A method comprising:
determining a first portion of aggregated user session data for a plurality of users based on at least one rule, wherein the first portion includes user sessions for users that have at least a minimum level of interaction with a corresponding website;
generating a session dataset based on the determined first portion of the aggregated user session data:
training a machine learning model based on the session dataset;
receiving user session data for a user from a server, wherein the user session data is aggregated with the session dataset;
applying the trained machine learning model to the user session data to generate output data, the output data including a first value associated with the user session data;
comparing the first value to a predetermined threshold to generate a comparison;
determining, based on the comparison, whether the user session data includes polluted data;
generating item recommendation data identifying at least one item to advertise based on the determination of whether the user session data includes polluted data;
transmitting the item recommendation data to the server;
refining, based on the determination of whether the user session data includes polluted data, the machine learning model, wherein refining the machine learning model includes removing the polluted data from the aggregated session dataset;
generating loss data based on the output data, the loss data being a difference between the output data and session data within the session dataset; and
refining the machine learning model based on the loss data.

12. The method of claim 11 comprising:
storing the trained machine learning model within a data repository.

13. The method of claim 12 wherein the machine learning model is a sequential Generative Adversarial Networks (GAN) model comprising a generator and a discriminator, and wherein training the machine learning model comprises training the generator with the determined first portion of the aggregated user session data, and wherein the generator converges to a distribution of real sequences of the first portion of the aggregated user session data and the discriminator learns a decision boundary around the distribution of the real sequences.

14. The method of claim 13, comprising determining that the first portion of the aggregated user session data is not polluted based on the at least one rule.

15. The method of claim 12 comprising validating the machine learning model by:
applying the machine learning model to a second portion of the aggregated user session data to generate a second value; and
determining whether a metric is satisfied based on the second value.

16. A non-transitory computer readable medium having instructions stored thereon, wherein the instructions, when executed by at least one processor, cause a device to perform operations comprising:
determining a first portion of aggregated user session data for a plurality of users based on at least one rule, wherein the first portion includes user sessions for users that have at least a minimum level of interaction with a corresponding website;
generating a session dataset based on the determined first portion of the aggregated user session data;
training a machine learning model based on the session dataset;
receiving user session data for a user from a server, wherein the user session data is aggregated with the session dataset;
applying the trained machine learning model to the user session data to generate output data, the output data including a first value associated with the user session data;
comparing the first value to a predetermined threshold to generate a comparison;
determining, based on the comparison, whether the user session data includes polluted data;
generating item recommendation data identifying at least one item to advertise based on the determination of whether the user session data includes polluted data;
transmitting the item recommendation data to the server;
refining, based on the determination of whether the user session data includes polluted data, the machine learning model, wherein refining the machine learning model includes removing the polluted data from the aggregated session dataset;

generating loss data based on the output data, the loss data being a difference between the output data and session data within the session dataset; and refining the machine learning model based on the loss data.

17. The non-transitory computer readable medium of claim 16, further comprising instructions stored thereon that, when executed by at least one processor, further cause the device to perform operations comprising:

storing the trained machine learning model within a data repository.

18. The non-transitory computer readable medium of claim 17, wherein the machine learning model is a sequential Generative Adversarial Networks (GAN) model comprising a generator and a discriminator, and further comprising instructions stored thereon that, when executed by at least one processor, further cause the device to perform operations comprising training the generator with the determined first portion of the aggregated user session data, and wherein the generator converges to a distribution of real sequences of the first portion of the aggregated user session data and the discriminator learns a decision boundary around the distribution of the real sequences.

19. The non-transitory computer readable medium of claim 18, further comprising instructions stored thereon that, when executed by at least one processor, further cause the device to perform operations comprising determining that the first portion of the aggregated user session data is not polluted based on the at least one rule.

20. The non-transitory computer readable medium of claim 17, further comprising instructions stored thereon that, when executed by at least one processor, further cause the device to perform operations comprising validating the machine learning model by:

applying the machine learning model to a second portion of the aggregated user session data to generate a second value; and determining whether a metric is satisfied based on the second value.

\* \* \* \* \*